A. P. HAMMON, J. H. & S. LINCOLN & T. W. HAMMON.
CULTIVATOR.
No. 60,722. Patented Jan. 1, 1867.
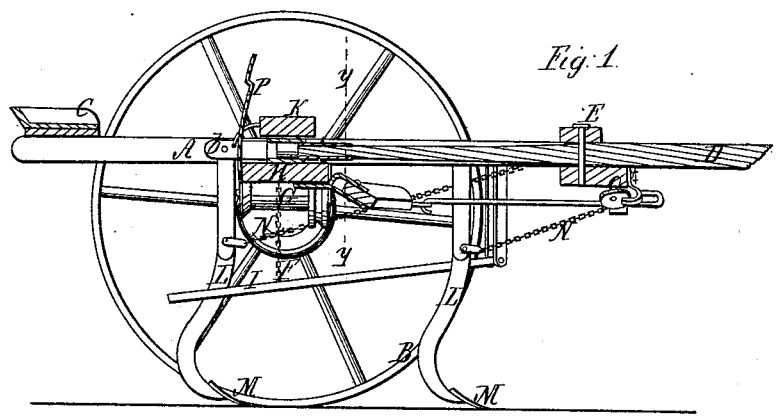
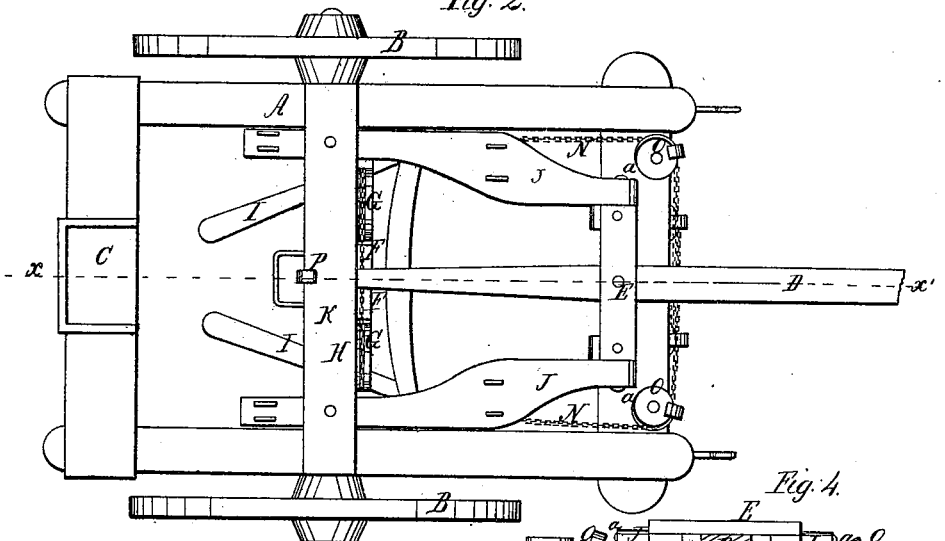
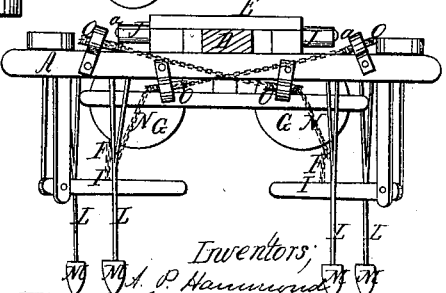

United States Patent Office.

A. P. HAMMON, J. H. LINCOLN, S. LINCOLN, AND T. W. HAMMON, OF MONTFORT, WISCONSIN.

*Letters Patent No. 60,722, dated January 1, 1867.*

---

IMPROVEMENT IN CULTIVATORS.

---

*The Schedule referred to in these Letters Patent and making part of the same.*

---

TO ALL WHOM IT MAY CONCERN:

Be it known that we, A. P. HAMMON, J. H. LINCOLN, S. LINCOLN, and T. W. HAMMON, of Montfort, in the county of Grant, and State of Wisconsin, have invented a new and improved Cultivator; and we do hereby declare that the following is a full, clear, and exact description thereof, which will enable those skilled in the art to make and use the same, reference being had to the accompanying drawings, forming part of this specification, in which—

Figure 1 is a side sectional view of our invention, taken in the line $x\ x$, fig. 2.

Figure 2, a plan or top view of the same.

Figure 3, a transverse vertical section of the same, taken in the line $y\ y$, fig. 1.

Figure 4, a front view of the same.

Similar letters of reference indicate corresponding parts.

This invention relates to a new and improved device for cultivating plants grown in hills or drills, and it relates to a new and improved manner of arranging the ploughs, whereby the same are made to penetrate the earth at a uniform depth, whether the device is passing over horizontal or inclined ground, and it also consists in a novel means for guiding the machine, whereby the ploughs may, with the greatest facility, be made to conform to the sinuosities of the rows of plants. A represents a rectangular frame, which is mounted on two wheels, B B, and has the driver's seat, C, on its rear end; and D is the draught-pole, which is secured by a pivot bolt, E, to the front part of the frame A, and has cords or chains, F F, attached to its rear end, said cords or chains projecting from the draught-pole at opposite sides, and passing over pulleys, G G, attached to the axle H, and connected each to a treadle, I, at their lower ends. (See, more particularly, fig. 3.) The treadles I are within convenient reach of the driver on his seat, C, so that they may be operated with facility. J J represent two plough beams, the front ends of which are secured by pivot bolts, $a\ a$, to the front part of the frame A, so that they may rise freely up and down. The rear ends of these beams are connected by a cross-bar, K, and to each plough beam there are attached by pivots, $b$, two plough standards, L L, one being in front of the other, and the two front standards being rather nearer each other than the rear ones. These standards have the ordinary shovel ploughs, M, attached to them, and the standard of the front plough of one beam is connected by a cord or chain, N, with the rear plough of the opposite beam, and *vice versa*, said cords or chains, N, passing around suitable guide pulleys, O, at the front part of the frame A. By this arrangement it will be seen that if the standards L of one beam are shoved backward, the standards L of the other beam will be shoved forward, and *vice versa*. Hence the ploughs will penetrate the earth at a uniform depth at both sides of the machine, for if the latter be passing over inclined ground, or the wheel at one side of the machine be travelling in a furrow previously made, so as to give the ploughs at the depressed side a tendency to penetrate the earth to a greater depth than those at the opposite side, the former will be shoved back and the latter shoved forward, and the depth of furrows equalized. The driver, by operating the treadles I, and thus acting upon the rear of the draught-pole, may guide the device with facility either to the right or left, and the ploughs thereby made to conform to the sinuosities of the rows of plants, and at any time when it is required to raise all the ploughs out of the ground, the driver simply raises the rear of the plough beams, which are secured in that position by means of a catch, P.

Having thus described our invention, we claim as new, and desire to secure by Letters Patent—

1. The pivoting of the draught-pole D to the frame A, and the connecting of the rear end of the former to treadles, I I, substantially as and for the purpose set forth.

2. The connecting of the plough standards of the two beams J J in the manner shown, or in any equivalent way, so that when the ploughs of one beam are moved or shoved backward, those of the opposite beam will be moved forward, and *vice versa*, for the purpose specified.

A. P. HAMMON,
J. H. LINCOLN,
S. LINCOLN,
T. W. HAMMON.

Witnesses:
THOMAS LAIRD,
W. O. THOMAS.